Patented Oct. 29, 1946

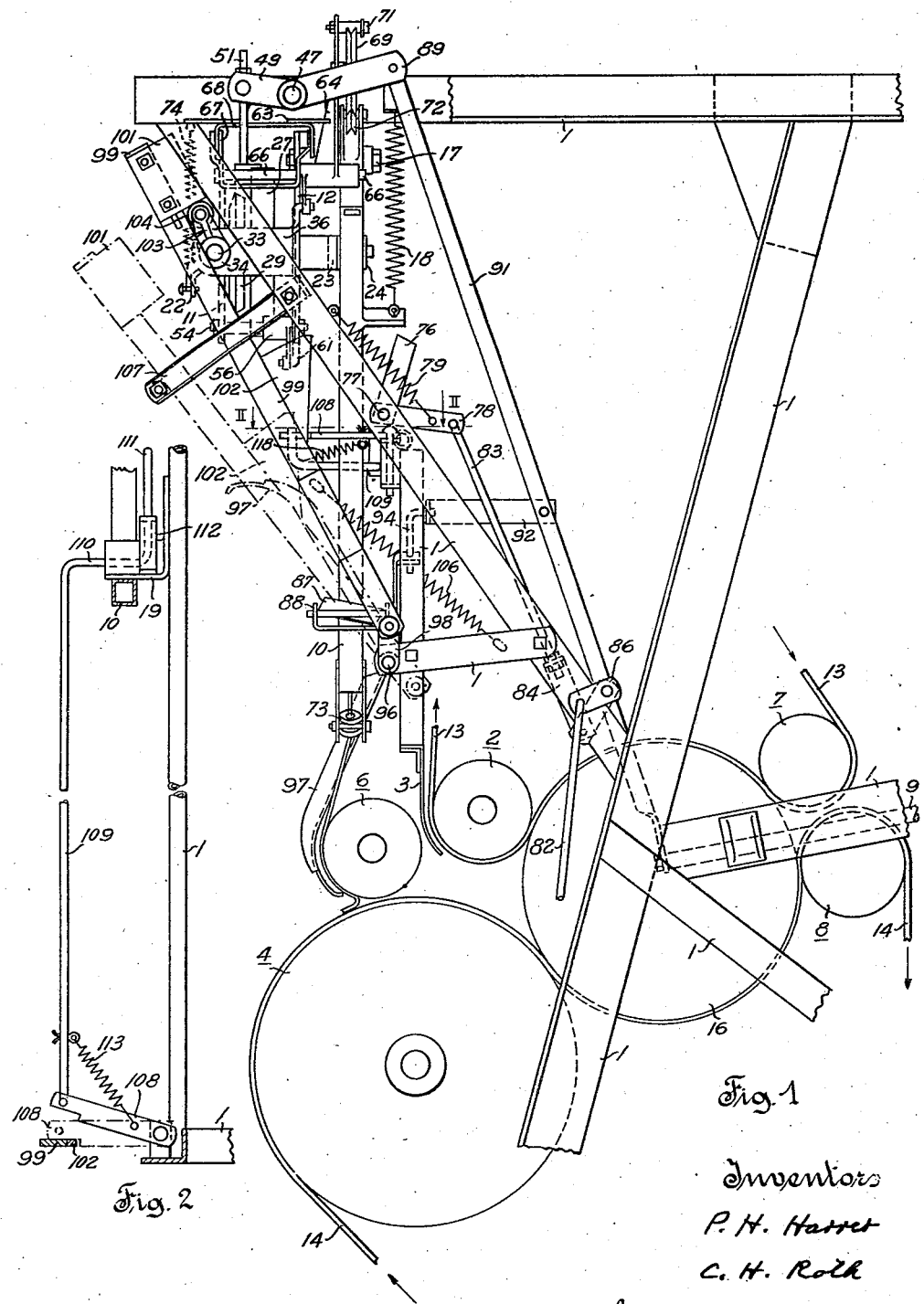

2,410,159

UNITED STATES PATENT OFFICE 2,410,159

ROTARY BALER

Paul H. Harrer and Clayton H. Roth, La Porte, Ind., assignors to Allis-Chalmers Manufacturing Company, Milwaukee, Wis., a corporation of Delaware Application March 4, 1944, Serial No. 525,008

14 Claims. (Cl. 100—1)

1

This invention relates generally to mechanism for wrapping any suitable binding material (hereinafter called twine) around a cylindrical bale while it is disposed within the machine forming same and more particularly to the type of mechanism embodying a twine feeding member (hereinafter called a tube) operative to engage the twine to be fed therefrom with the material passing into the machine whereby the end of the twine is carried into the machine and around the bale disposed therein.

In operating baling machines, it sometimes happens due to the lack of material entering the machine and/or to the nature and arrangement of the material receiving and conveying parts thereof that the end of the twine hanging from the tube is not carried into the machine and around the bale as contemplated. Consequently, wrapping of the bale is delayed until the end of the twine can be made to enter the machine and as a result the number of bales which can be formed and wrapped in a given time is materially reduced.

It is therefore the primary object of this invention to provide a twine wrapping mechanism of the type hereinbefore referred to with a means operative to engage the twine with a material receiving and conveying part of the machine such as will insure the end of the twine being pulled into the machine and around the bale disposed therein irrespective of the nature and arrangement of such a part and irrespective of whether material to be baled is then passing into the machine.

Another object of this invention is to provide a twine wrapping mechanism of said type with a means rendered automatically operative to engage the twine with a material receiving and conveying part of the machine whenever wrapping of the bale is to be initiated.

Still another object of this invention is to provide a twine wrapping mechanism of said type with a means automatically operative to repeatedly engage the twine with a material receiving and conveying part of the machine until the end of the twine is pulled into the machine.

A further object of this invention is to provide a twine wrapping mechanism of said type with a novel correlation of features operative automatically or otherwise to insure an immediate wrapping of the formed bale.

In accordance with this invention, one or more of the above stated objects may be readily accomplished in whole or in part by providing a member positionable to engage the twine hanging from the tube with a material receiving and conveying part of the machine which, for example may be of the type disclosed in U. F. Luebben's United States Patent No. 2,336,491, December 14, 1943, Rotary baler, whereby said part will seize and pull the end of the twine into the machine and by providing means for controllably operating said member either manually or automatically whenever wrapping of the bale is to be initiated.

The invention is illustrated as applied to the twine wrapping mechanism which is disclosed and claimed in Paul H. Harrer's and Charles J. Scranton's copending application Serial No. 524,888, filed March 3, 1944, and which is also disclosed but not claimed in Paul H. Harrer's copending application Serial No. 524,190, filed February 28, 1944.

The invention accordingly consists of the various features of construction, combinations of elements and arrangements of parts as is more fully set forth in the appended claims and in the detailed description, in which:

Fig. 1 is a partial side elevation of a baling machine provided with a twine wrapping mechanism embodying the invention;

Fig. 2 is a partial section taken on line II—II of Fig. 1; and

Figure 3:
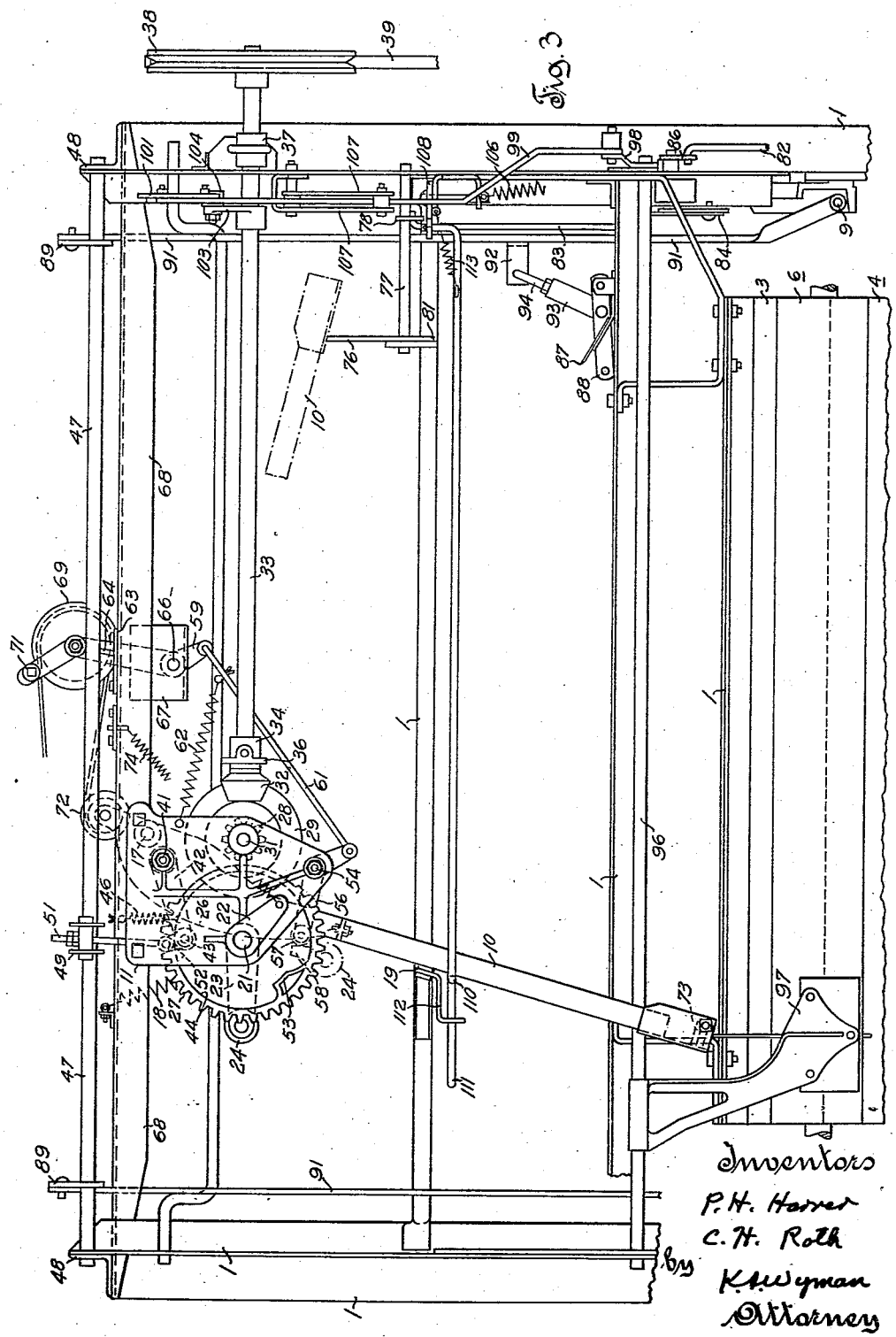
Fig. 3 is a partial front elevation of the structure shown in Fig. 1.

Referring to Figs. 1 and 3 of the drawings, it is seen that the invention may be applied to a baling machine comprising a frame structure 1 operatively mounting an upper drive roll assembly 2, a stationary shield or guard 3 for the front side of assembly 2, a lower drive roll assembly 4, a press roll assembly 6, upper and lower trip roll assemblies 7 and 8, respectively, a bale discharge latch release bar 9, a twine feeding tube 10, and a housing formed by a pair of spaced rigidly connected and supported front and rear plates 11 and 12, respectively, operatively supporting the twine tube 10 and mechanism for controllably positioning and positively moving the tube lengthwise of the bale during the wrapping operation.

One or more endless bale forming bands 13 are mounted for movement over the roll portions of assembly 2, over the roll portion of assembly 7 and over the roll portion of an upper tension roll assembly (not shown) and one or more similar bands 14 are mounted for movement over the roll portion of assembly 4, over the roll portion of assembly 8 and over the roll portion of a lower tension roll assembly also (not shown).

In this connection, the correlation and operation of the various roll assemblies, the bale forming bands and the latch release bar 9 hereinbefore identified are the functional equivalent of the corresponding parts of the U. F. Luebben baling machine disclosed in U. S. Patents 2,096,990 and 2,336,491, issued October 26, 1937, and December 14, 1943, respectively, and since a detailed disclosure of such parts is not essential for a complete understanding of the present invention, it should suffice to point out that material to be baled is fed to and passes between the roll portions of the press and lower drive roll assemblies whereupon it engages and is rolled into a compact cylindrical bale 16 by the action of the oppositely moving bands 13 and 14, that when the bale attains the desired diameter, the feed of material to the machine is terminated and the latch release bar 9 actuated whereupon the trip roll assemblies move apart and effect discharge of the bale from the machine, and that upon discharge of the bale, the trip roll assemblies are immediately returned to their initial bale starting position whereupon material may be again fed to the machine to initiate the formation of another bale.

Twine tube 10 is supported for angular movement by having its upper end pivotally mounted on a fixed pin 17 projecting rearward from rear plate 12 and is biased by gravity and by the action of a spring 18 to assume the full line position shown in Figs. 1 and 3; movement in the clockwise direction being limited by engagement with a fixed stop member 19 carried by a part of the frame structure 1. Plates 11 and 12 rotatably support a shaft 21 which extends therethrough and presents free end portions to which are secured front and rear crank arms 22 and 23, respectively; crank arm 23 having mounted thereon a laterally projecting roller 24 adapted to engage the cam edge portion 26 on twine tube 10 and thereby move the twine tube to its dotted line position shown in Fig. 3. A spur gear 27 having a non-toothed peripheral portion (hereinafter called a partial gear) is fixed on shaft 21 between plates 11 and 12 in such position that said shaft and gear are driven through a predetermined angle by a spur gear 28 integral with the hub portion of a bevel gear 29 rotatably mounted on a fixed shaft 31 which extends between and is supported by said plates. Bevel gear 29 meshes with and is driven by a pinion 32 fixed on a shaft 33 which has its adjacent end rotatably mounted in a bearing 34 supported by an integral forwardly extending arm 36 on rear plate 12. The opposite end of shaft 33 is rotatably supported in a bearing 37 mounted on the frame structure 1 and carries at its outer end a V-belt pulley 38 driven by a V-belt 39 which is in turn driven from a normally rotating part of the machine so that for all practical purposes the shaft 33 may be considered as continuously rotating.

Front plate 11 has fixed thereon a rearwardly projecting fixed pin 41 on which is pivotally mounted a crank arm 42 carrying a laterally projecting roller 43 adapted to engage and ride on the inner peripheral surface 44 of the toothed flange portion of partial gear 27; arm 42 being biased to maintain roller 43 in continuous engagement with surface 44 by means of a spring 46. A transverse shaft 47 is rotatably mounted in bearings 48 carried by opposite portions of the frame structure 1 and is provided with a laterally projecting arm 49 which is connected with crank arm 42 by means of links 51 and 52. Surface 44 is provided with an integral cam portion 53 and the movement of roller 43 thereover results in a counterclockwise movement of crank arm 42 as viewed in Fig. 3 and a corresponding movement of shaft 47 as viewed in Fig. 1.

Plates 11 and 12 also have secured therebetween a fixed shaft 54 on which is pivotally mounted a bell crank lever 56 having on one arm thereof a roller 57 adapted to engage a stop projection 58 integral with the rear side surface of partial gear 27 and having its other arm connected for simultaneous movement with a downwardly extending arm of a pivotally mounted bell crank lever 59 by means of a link 61; bell cranks 56 and 59 both being normally retained in the positions shown by means of a spring 62 and a recessed stop plate 63 into the recessed portion of which projects a forwardly extending strengthening rib 64 integral with the upper arm of bell crank 59. Bell crank 59 is pivotally mounted on a fixed rearwardly projecting pin 66 carried by a U-shaped bracket 67 secured to the underside of an inverted U-shaped frame member 68. Stop plate 63 is mounted on and projects rearward from frame member 68 and movement of bell cranks 56 and 59 in a counterclockwise direction from the positions shown in Fig. 3 is limited by the engagement of rib 64 on bell crank 59 with the opposite edge of the recess in stop plate 63. The upwardly projecting arm of bell crank 59 carries a pair of twine tension disks 69 and a twine roller 71 operative to force the twine between the disks 69; disks 69 being alined with a twine guide roller 72 carried by the upper end of twine tube 10. Twine from a suitable source passes between roller 71 and disks 69, over guide roller 72, through tube 10 and out the ferruled lower end 73 thereof as indicated in Fig. 3.

Shaft 21, front and rear crank arms 22 and 23, and partial gear 27 rotate as a unit and are biased to the positions shown in Fig. 3 by means of a spring 74 connecting arm 22 with a fixed part of the structure; the arrangement of parts being such that spring 74 acts to rotate shaft 21, crank arms 22 and 23 and partial gear 27 in a counterclockwise direction as viewed in Fig. 3, that such movement is prevented by the engagement of roller 57 on bell crank 56 with the stop projection 58 on partial gear 27, that spur gear 28 is out of mesh with the toothed portion of partial gear 27 and is therefore inoperative to drive partial gear 27 counterclockwise unless said partial gear is first rotated counterclockwise a sufficient distance to engage the first tooth thereon with gear 28, and that twine tube 10 is retained in its raised dotted line position shown in Fig. 3 by means of a latch 76 fixed on a rod 77 pivotally mounted on the frame structure 1 and biased to assume a position directly beneath twine tube 10 by means of an arm 78 fixed on rod 77 and a spring 79 connecting arm 78 with a fixed part of the structure; movement of the latch in a counterclockwise direction as viewed in Fig. 1 being limited by a stop projection 81 adapted to engage that portion of the frame structure immediately beneath rod 77. Arm 78 is interconnected with an actuator 82 by means of links 83, 84 and a bell crank lever 86 having one arm connected with actuator 82 and having its other arm connected with link 84; the latch 76 being shown as held in its twine tube releasing position by actuator 82.

The frame structure 1 also mounts a fixed twine cutting knife 87 positioned to be engaged by the twine fed from the ferruled end of tube 10 as it approaches its dotted line raised position shown in Fig. 3 and a pivotally mounted knife guard 88 is normally positioned as shown in Fig. 3 to prevent the twine from contacting the knife. Shaft 47 is also provided with a pair of arms 89 one of which is shown as operatively connected with the adjacent end of latch release bar 9 by means of a link 91 and a part 92 on link 91 is operatively connected with an arm 93 on twine guard 88 by means of a link 94; the arrangement being such that the knife guard is withdrawn from in front of knife 87 just prior to the actuation of latch release bar 9 to effect a discharge of the bale from the machine.

In addition, opposite side portions of the frame structure 1 pivotally support a transverse rock shaft 96 on which is fixed for movement therewith a member 97 positionable to engage the twine hanging from the ferruled end of tube 10 and tuck or push same between the coacting portions of the press and lower drive roll assemblies as is best shown in Fig. 1; shaft 96 having fixed on the right hand end thereof as viewed in Fig. 3 an actuating crank arm 98 which is pivotally connected with a vertically extending bar 99 having at its upper end an integral rearwardly extending rectangular projection 101 disposed adjacent the normally rotating shaft 33 and having intermediate its ends an integral rearwardly extending triangular projection 102. Shaft 33 has fixed thereon a crank arm 103 carrying a laterally projecting roller 104 adapted to engage the underside of projection 101 on bar 99 and thereby raise bar 99 to the approximate position shown in Fig. 1; the projection 101 being retained in engagement with roller 104 by a spring 106 which acts to move bar 99 to the right and downward as viewed in Fig. 1. Further movement of bar 99 toward the right is prevented by its engagement with shaft 33 and when roller 104 moves out from beneath projection 101 spring 106 immediately moves bar 99 downward and engages the underside of projection 101 with the top side of shaft 33 in which position it is held by spring 106 until the roller 104 again engages bar 99 and moves it toward the left whereupon the underside of projection 101 moves from engagement with the top side of shaft 33 into engagement with the top side of roller 104 which again raises bar 99 thereby starting the cycle of reciprocation just described. Lateral movement of bar 99 is prevented by a pair of spaced rigidly connected guide plates 107 which are secured to the frame structure 1 and between which extends the bar 99 as is best shown in Fig. 3. Obviously, the reciprocation of bar 99 results in an oscillation of shaft 96 and a twine tucking movement of the member 97 secured thereto.

Reciprocation of bar 99 and thereby the oscillation of shaft 96 is controlled by a pivotally mounted latch plate 108 (see Fig. 2) positionable to be engaged by the triangular projection 102 on bar 99; the arrangement of parts being such that so long as the plate 108 is in its full line position shown in Fig. 2 it is never engaged by the projection 102 on bar 99 and that when it is moved to its dotted line position, it will be engaged by the projection 102 as the bar 99 moves downward from engagement with the roller 104 on crank arm 103 and as a result the bar will pivot in a counterclockwise direction away from shaft 33 and be held in a position such that the upper portion of the bar and the projection 101 thereon will not be engaged by the roller 104 on the continuously rotating crank arm 103. Latch plate 108 is moved to its full line position shown in Fig. 2 by means of a link 109 having one end pivotally connected with plate 108 and having its opposite end portion bent to provide an offset portion 110 positioned in the path of the twine tube and to provide a parallel portion 111 slidably mounted in a bracket 112 carried by that portion of the frame structure 1 mounting the twine tube stop 19. A spring 113 connects link 109 with an intermediate portion of latch plate 108 and the arrangement of these parts is such that when the twine tube 10 is in its fully raised position, spring 113 retains the latch plate 108 in its dotted line position shown in Fig. 2, that when the twine tube drops to its full line position shown, it first engages the offset portion 110 and then the stop 19 and the resulting movement of link 109 positions the latch plate 108 in its full line position shown in Fig. 2 thereby releasing bar 99 which is immediately moved into the path of the roller carrying crank arm 103 by the action of spring 106 and that the latch plate will be retained in its full line position until the twine tube 10 is moved away from stop 19 a sufficient distance to permit spring 113 to return the latch plate to its dotted line position.

During the interval twine tube 10 retains latch plate 108 in its full line position, the bar 99 is reciprocated each time the crank arm 103 makes a complete revolution and such reciprocation continues until the latch plate 108 is returned to its dotted line position whereupon the next downward movement of bar 99 results in the edge of projection 102 engaging said latch plate and a movement of bar 99 to its inoperative position where it is retained by the coaction of latch plate 108 and projection 102 until the latch plate is again released by the dropping of twine tube 10. During the formation of a bale, twine tube 10 is retained in its raised dotted line position shown in Fig. 3 by means of latch 76 and when the bale attains the desired diameter, actuator 82 is pulled downward which withdraws latch 76 from beneath twine tube 10 whereupon the tube swings to its full line position best shown in Fig. 3 and in so doing actuates link 109 thereby initiating operation of the twine tucking mechanism hereinbefore described which pushes the twine hanging from tube 10 against the proximate roll portions of the press and lower drive roll assemblies as indicated in Fig. 1 whereupon the twine is engaged and carried into the machine by said roll portions and due to the movement of the bands 14 and to the rotation of the bale 16, around the latter; the feed of material passing between the press and drive roll assemblies being terminated preferably as soon as the twine tube reaches its full line position against stop 19.

The pull exerted on the twine in passing into the machine and around the bale moves the interconnected bell crank levers 56 and 59 counterclockwise as viewed in Fig. 3 thereby withdrawing the roller 57 carried by lever 56 from engagement with stop projection 58 whereupon spring 74 rotates shaft 21 counterclockwise until the first tooth on partial gear 27 engages spur gear 28; the latter and spring 74 rotating gear 27 and thereby shaft 21 and crank arms 22 and 23 counterclockwise until these parts attain the relative positions shown in Fig. 3. The initial rotation of gear 27, which is effected by spring 74, positions the roller 24 on crank arm 23 in proximate spaced relation to the cam edge 26 on twine tube 10 and the continued rotation of gear 27 engages roller 24 with said cam surface whereupon twine tube 10 moves in a counterclockwise direction toward its fully raised dotted line position shown. As the twine tube moves away from stop 19, spring 113 acts to return latch plate 108 to its normal position thereby terminating operation of the twine tucking mechanism as previously described. When twine tube 10 reaches its dotted line position, the pull on actuator 82 is released and spring 79 acts on arm 78 to reposition latch 76 beneath twine tube 10 so that when the roller 24 moves from engagement with the cam edge surface 26, the tube will be retained in its raised dotted line position.

Cam 25 is preferably designed to retain tube 10 substantially stationary in its raised dotted line position during the interval the cam portion 53 on partial gear 27 is in engagement with the roller 43 on arm 42 which engagement moves arm 42 in a counterclockwise direction as viewed in Fig. 3 and through the medium of links 51, 52 and arm 49 produces a counterclockwise movement of shaft 47 as viewed in Fig. 1 which in turn moves link 91 thereby withdrawing twine guard 88 from in front of knife 87 and thereby actuating latch release bar 9 whereupon the twine snaps against and is cut by knife 87 and the trip roll assemblies move apart to discharge the bale from the machine; the twine cutting and bale discharging operations taking place in the sequence specified. As soon as the trip roll assemblies return to their initial bale starting position, material may be again fed to the machine to initiate the formation of another bale. The cutting of the twine releases the pull on bell crank lever 59 whereupon spring 62 returns the bell crank levers 56 and 59 to the positions shown in Fig. 3 and the continued rotation of gear 27 by the gear 28 and the action of spring 74 brings the stop projection 58 into engagement with the roller 57 on bell crank 56 and this shown arrangement of parts is maintained by the action of spring 74 until the initiation of another twine wrapping operation.

It should now be obvious that whenever actuator 82 is moved to release twine tube 10, the swinging of the tube from its dotted line to its full line position initiates operation of the twine tucking mechanism which repeatedly engages the twine with a material receiving and conveying part of the machine (in this case the proximate coacting portions of the press and lower drive roll assemblies) until the end of the twine is pulled into the machine and around the bale disposed therein whereupon the operation of the twine tucking mechanism ceases and the wrapping operation continues and is completed as hereinbefore described.

The invention is applicable to all types of rotary baling machines irrespective of the nature and arrangement of the material receiving and conveying parts of the machine and irrespective of whether the material is fed to such parts manually or by a conveyor and it should therefore be understood that it is not intended to limit the invention to the exact construction and mode of operation herein shown and described as various modifications within the scope of the appended claims may occur to persons skilled in the art.

It is claimed and desired to secure by Letters Patent:

1. In a machine embodying means for rolling material delivered thereto into a formed cylindrical bale of predetermined diameter and means for positioning the twine to be wrapped around the bale while it is in the machine in proximity to a material conveying part of the bale forming means, a movably mounted member operative to so engage the twine with said part that the twine will be carried into the machine by such part and around the bale disposed therein, and means for operating said member and for maintaining same inoperative in a predetermined out-of-the-way position.

2. In a machine embodying means for rolling material delivered thereto into a formed cylindrical bale of predetermined diameter and means for wrapping twine about the formed bale while it is in the machine including a tube operative to position the twine hanging therefrom in proximity to a material receiving and conveying part of the bale forming means, a movably mounted member operative to so engage the twine with said part that the twine will be carried into said machine by such part and around the bale disposed therein, and means for operating said member and for maintaining same inoperative in a predetermined out-of-the-way position.

3. In a machine embodying means for rolling material delivered thereto into a formed cylindrical bale of predetermined diameter and means for wrapping twine about the formed bale while it is in the machine including a tube operative to position the twine carried thereby in proximity to a material receiving and conveying part of the bale forming means, a movably mounted member operative to so position the twine on said part that the twine will be carried into said machine by such part and around the bale disposed therein, and means for moving said member to perform said twine positioning operation and for maintaining said member inoperative in a predetermined out-of-the-way position.

4. In a machine embodying means for rolling material delivered thereto into a formed cylindrical bale of predetermined diameter and means for wrapping twine about the formed bale while it is in the machine including a tube movable to position the twine carried thereby adjacent one end of the bale and in proximity to a material receiving and conveying part of the bale forming means, a movably mounted member operative to so engage the twine with said part that the twine will be carried into said machine by such part and around the bale disposed therein, and means responsive to predetermined movements of said tube for controlling the operation of said member.

5. In a machine embodying means for rolling material delivered thereto into a formed cylindrical bale of predetermined diameter and apparatus for wrapping twine around the bale while it is in the machine including a movable element operative to position the twine in proximity to a material conveying part of the bale forming means, a movably mounted member operative to so engage the twine with said part that the twine will be carried into the machine by such part and around the bale disposed therein, means for operating said member and means responsive to the twine positioning movement of said element for controlling the operation of said member.

6. In a machine embodying means for rolling material delivered thereto into a formed cylindrical bale of predetermined diameter and means for positioning twine to be wrapped around the bale while it is in the machine in proximity to a material conveying part of the bale forming means, a movably mounted member operative to so engage the twine with said part that the twine will be carried into said machine by such part and around the bale disposed therein, means for operating said member to repeatedly so engage the twine with said part, and means controlled by the pull exerted on the twine in entering the machine for terminating the operation of said member.

7. In a machine embodying means for rolling material delivered thereto into a formed cylindrical bale of predetermined diameter and means for positioning twine to be wrapped around the bale while it is in the machine in proximity to a material conveying part of the bale forming means, a movably mounted member operative to so engage the twine with said part that the twine will be carried into the machine by such part and around the bale disposed therein, means for releasably retaining said member inoperative in a predetermined out-of-the-way position, and means responsive to the positioning of the twine in proximity to said part for operating said member.

8. In a machine embodying means for rolling material delivered thereto into a formed cylindrical bale of predetermined diameter and means including a tube movable to position the twine carried thereby adjacent one end of the bale and in proximity to a material receiving and conveying part of the bale forming means and then movable longitudinally of the bale toward the other end thereof, a movably mounted member operative to so engage the twine with said part that the twine will be carried into said machine by such part and around the bale disposed therein, means responsive to the positioning of said end of the twine adjacent said one end of the bale and in proximity to said part for operating said member, and means responsive to said longitudinal movement of the tube for terminating operation of said member.

9. In a machine embodying means for rolling material delivered thereto into a formed cylindrical bale of predetermined diameter, means including a tube movable longitudinally of the formed bale for spirally wrapping twine about a predetermined length of the bale while it is in the machine, means for releasably retaining said tube positioned adjacent one end of the bale, and means operative to release and position said tube adjacent the other end of the bale with the twine carried thereby disposed in proximity to a material receiving and conveying part of the bale forming means, a movably mounted member operative to so engage the twine with said part that the twine will be carried into the machine by such part and around the bale disposed therein, means for releasably retaining said member inoperative in a predetermined out-of-the-way position, means responsive to the positioning of said tube adjacent said other end of the bale for releasing and operating said member to repeatedly so engage the twine with said part, and means responsive to a movement of said tube from adjacent said other end of the bale toward said one end thereof for controlling reestablishment of the connection between said member and the means releasably retaining same inoperative.

10. In a machine embodying means including a press roll and a coacting material conveying part for rolling material passing therebetween into a formed cylindrical bale of predetermined diameter, means including a tube movable longitudinally of the formed bale for spirally wrapping twine about a predetermined length of the bale while it is in said machine, means for releasably retaining said tube positioned adjacent one end of the bale, and means operative to release and position said tube adjacent the other end of the bale with the twine carried thereby disposed in proximity to said press roll and part, a movably mounted member operative to tuck the twine between said press roll and part for movement thereby into the machine, a movably mounted element operatively connected with said member, actuating means for operating said element to move said member and thereby tuck the twine between said press roll and part, latch means for releasably retaining said element and member inoperative in predetermined out-of-the-way positions relative to said press roll and part and relative to said actuating means, respectively, and means operative to control said latch means and thereby the operation of said element and member in response to predetermined movements of said tube.

11. In combination in a machine embodying mechanism for rolling material delivered thereto into a formed cylindrical bale and for positioning twine, which is to be carried into the machine and wrapped around the formed bale disposed therein, in proximity to a moving material-conveying means having a surface portion which is normally covered at least in part by the material passing on into the machine, an additional means operative to engage the twine with a part of said surface portion, in the event there is no material covering same, in a manner rendering said conveying means effective to carry the twine on into the machine.

12. In combination in a machine embodying mechanism for rolling material delivered thereto into a formed cylindrical bale and for positioning twine, which is to be carried into the machine and wrapped around the formed bale disposed therein, in proximity to a moving material-conveying means which is normally covered at least in part by the material passing thereover and into the machine, a movably mounted member selectively positionable to engage the twine with a part of said conveying means in a manner rendering said part effective to carry the twine on into the machine in the event there is no material entering same.

13. In combination in a machine embodying mechanism for rolling material delivered thereto into a formed cylindrical bale and for positioning twine, which is to be carried into the machine and wrapped around the formed bale disposed therein, in proximity to a part of the machine which moves in a direction tending to feed material into the machine, an additional means operative to engage the twine with said part in a manner rendering same effective to carry the twine on into the machine.

14. In combination in a machine embodying mechanism for rolling material delivered thereto into a formed cylindrical bale and for positioning twine, which is to be carried into the machine and wrapped around the formed bale disposed therein, in proximity to a part of the machine which moves in a direction tending to feed material into the machine, a movably mounted member operative to engage the twine with said part in a manner rendering same effective to carry the twine on into the machine, and means for operating said member and for maintaining same inoperative in a predetermined out-of-the-way position.

PAUL H. HARRER.
CLAYTON H. ROTH.